(12) United States Patent
Shaw et al.

(10) Patent No.: US 11,433,687 B2
(45) Date of Patent: Sep. 6, 2022

(54) ADAPTIVE SAMPLING

(71) Applicant: Hewlett-Packard Development Company, L.P., Spring, TX (US)

(72) Inventors: Mark Shaw, Boise, ID (US); Mark Wibbels, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/764,071

(22) PCT Filed: Dec. 1, 2017

(86) PCT No.: PCT/US2017/064324
§ 371 (c)(1),
(2) Date: May 14, 2020

(87) PCT Pub. No.: WO2019/108232
PCT Pub. Date: Jun. 6, 2019

(65) Prior Publication Data
US 2020/0369041 A1 Nov. 26, 2020

(51) Int. Cl.
*B41J 2/21* (2006.01)
*B41J 2/125* (2006.01)
*B41J 29/19* (2006.01)
*B41J 29/393* (2006.01)

(52) U.S. Cl.
CPC ............ *B41J 2/2135* (2013.01); *B41J 2/125* (2013.01); *B41J 29/19* (2013.01); *B41J 29/393* (2013.01)

(58) Field of Classification Search
CPC ........ B41J 29/393; B41J 2/2135; B41J 2/125; B41J 29/19; B41J 2/2132; B41J 2/2139
See application file for complete search history.

(56) References Cited

U.S. PATENT DOCUMENTS

| 5,488,458 A | 1/1996 | Benedict |
| 6,036,298 A | 3/2000 | Walker |
| 6,164,740 A | 12/2000 | Hirai |

(Continued)

FOREIGN PATENT DOCUMENTS

| CN | 101118363 | 2/2008 |
| JP | 2000132679 | 12/2000 |
| JP | 2013138305 B2 | 7/2013 |

OTHER PUBLICATIONS

PRITCHARD—The Print Guide: Moire, Dec. 11, 2009, http://the-print-guide.blogspot.in/2009/12/moire.html~7 pages.

*Primary Examiner* — Jannelle M Lebron
(74) *Attorney, Agent, or Firm* — Michael Dryja

(57) ABSTRACT

In one example, a printer with adaptive sampling includes a print engine, a monochrome scanner, a light source, and an analysis module. The light source has independently controlled primaries oriented to illuminate a media from the print engine. The analysis module includes a page selection module to select a chosen page of media for analysis, a heuristic analysis module to analyze the chosen page and determine a region of the page for analysis, a light control module to select a mono-color for the light source in region on the chosen page, and a quality module to accept an image of the chosen page and a scan of the chosen page with the monochrome scanner illuminated by the selected mono-color and compare the image and the scan within the region to determine a discrepancy.

12 Claims, 7 Drawing Sheets

(56) References Cited

U.S. PATENT DOCUMENTS

| | | |
|---|---|---|
| 6,883,892 B2 | 4/2005 | Sievert |
| 8,456,697 B2 | 6/2013 | Mestha et al. |
| 8,922,641 B2 | 12/2014 | Bertin et al. |
| 9,298,122 B2 | 3/2016 | Iwata et al. |
| 9,413,920 B2 | 8/2016 | Depalov et al. |
| 2002/0063896 A1 | 5/2002 | Rogalski |
| 2006/0279788 A1 | 12/2006 | Crouse et al. |
| 2010/0123752 A1 | 5/2010 | Eun |
| 2012/0257223 A1 | 10/2012 | Huang |
| 2017/0008300 A1* | 1/2017 | Baba .................... B41J 2/2132 |
| 2017/0011282 A1 | 1/2017 | Iwasaki et al. |

\* cited by examiner

ADAPTIVE SAMPLING

BACKGROUND

Printing technology has evolved so much over the last few decades that business and consumer customers now expect excellent print quality printed documents from their printers, such as laser and ink-based models. Due to these high customer expectations, the customers have begun to design their workflows to pay attention to the quality of the printed output as poor-quality printing results in wasted supplies and media as well as lower productivity.

BRIEF DESCRIPTION OF THE DRAWINGS

The disclosure is better understood regarding the following drawings. The elements of the drawings are not necessarily to scale relative to each other. Rather, the emphasis has instead been placed upon illustrating the claimed subject matter. Furthermore, like reference numerals designate corresponding similar parts throughout the several views. For brevity, reference numbers used in later drawings that are repeated may not be re-described.

DETAILED DESCRIPTION

Figure 1A:
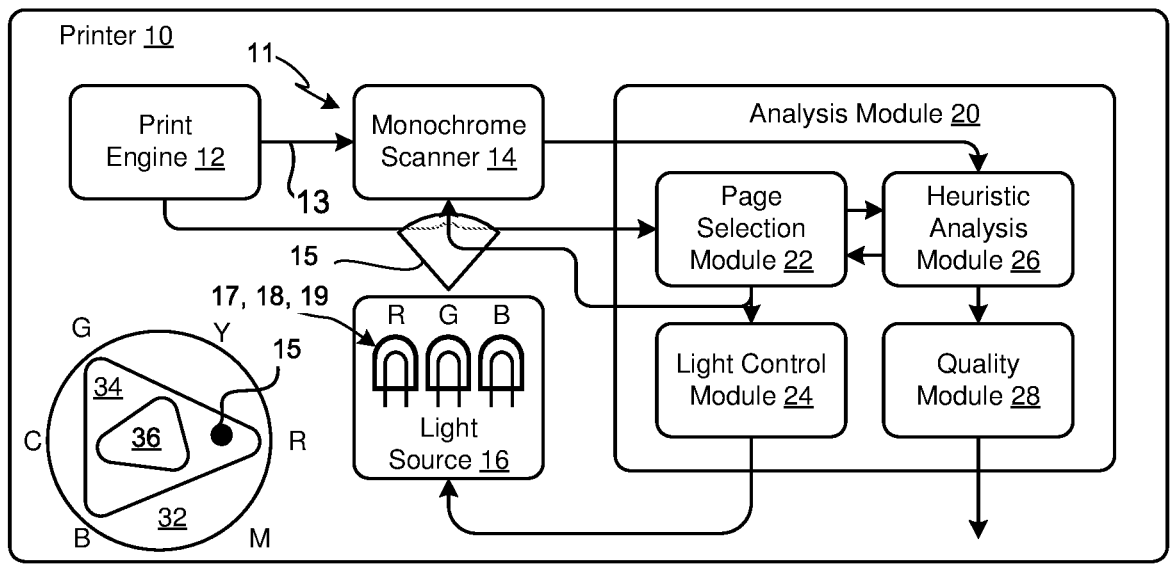
FIG. 1A is a block diagram of an example printer with adaptive sampling.

The issue of print quality assessment has been quite important in high-end commercial printing systems but transferring that technology to lower-end printers is not cost effective. Accordingly, when issues arise in lower-end printers, it may be difficult for business and consumer customers to know how to detect and correct problems that relate to printer health.

Described within is a system and method for adaptive sampling of printed pages to allow for monitoring and correction of printer health using an inline monochrome scanner with an adjustable color illumination source. The technique allows for improving detection of print quality defects by modulating the scanner light source for specific color planes. The technique also minimizes unwanted reflections from printer marks by the selective illumination and optimized sampling of the scanner to prevent aliasing artifacts. For instance, when developing an in-line image sensing system to identify the presence of defects in the image quality of a printed page, the sampling rate of the scanner will directly impact the type of defects that can be identified by the system. Conventional strobed sequential sampling with red/green/blue (RGB) filtered scanners is problematic because the sampling rate can alias with the printed halftone frequency of the printed page being scanned. The new technique improves the data fidelity through modification of the image sensing scanner system configuration along with an adaptive sampling of the printed pages.

When sampling a signal, the Nyquist criteria suggests a sampling frequency that is at least two times the highest signal frequency to prevent aliasing. Aliasing is an effect that causes different signals to become indistinguishable from each other during sampling. In a digital image, aliasing manifests itself often as a moiré pattern or a rippling effect. This spatial aliasing in the pattern of the image makes it look like it has waves or ripples radiating from a certain portion. For example, sampling a 150 LPI (lines per inch) halftone screen printed image using a 300 PPI (pixels per inch) RGB scanner may result in an "oil slick" moiré due to the aliasing. This aliasing problem is compounded because the scanner's contact image sensors (CIS) actually perform sequential sampling with multiple filtered RGB sensors in the motion axis. The motion axis is the direction in which the printed page transverses across the scanner. To sense color content, CIS image sensors sample sequentially in the motion axis, such as R/G/B/R/G/B, etc. This sequential sampling means that for a 300 PPI scan, a red sample is actually 1/900 height, followed by a green sample at 1/900 height, etc. and presents a problem when scanning halftoned content. For instance, a harmonic for the peak halftone frequency can alias, and the scanned image quality can be degraded for images on printed pages that break the "Nyquist condition" when scanned. Furthermore, as the printed page is moved faster across the scanner, the data rate will increase due to the sequential sampling of the signal. Consequently, an RGB sampled image on the printed page requires three times the data bandwidth of a monochromatic sampled image for the same physical area scanned on the printed page, thus increasing cost. These bandwidth and aliasing issues can become problematic for image sensing systems.

The new technique of adaptive sampling allows for the elimination of the constraints of sequential sampling with multiple filtered sensors by dynamically modulating the light source based on printed page content to minimize unwanted reflections while increasing absorptions to detect specific color content, using a monochromatic sensor for contiguous sampling, and adaptive sampling of the printed pages to target regions on the printed pages where the absorption of the light source is maximized for specific color planes. As such, adaptive sampling as used herein corresponds to selecting printed pages based on established criteria for specific printer health issues and dynamically modulating a color of a light source for a monochromatic scanner based on the expected content the scanned printed page in specific regions. More detail on the new technique for adaptive sampling follows in the description of the drawings.

FIG. 1A is a block diagram of an example printer 10 with adaptive sampling 11. In this example, the printer 10 receives a print job of one or more pages and a print engine 12 prints a page (a printed page) of the print job on a media (25, FIG. 1C). The print engine 12 may be laser-based, ink-based, wax-based, or another type of printing technology. The print engine 12 may include multiple colors, such as cyan, magenta, yellow, and black (CMYK) and in some examples, may include light cyan and light magenta. The printed page is then sent via a media transfer mechanism to a monochrome scanner 14. To avoid Nyquist sampling issues, the monochrome scanner 14 should have at least two times the resolution of the expected printed content. In some examples, the monochrome scanner 14 may have less than two times the resolution of the highest resolution mode of the print engine 12, and in those examples, the adaptive sampling 11 is to be performed on regions that are printed with content that has less than two times the resolution of the monochrome scanner 14.

The monochrome scanner 14 is illuminated with a light source 16 having multiple primary colors, such as red, green, and blue in one example to create a mono-color 15 to illuminate the media 25 as it is scanned by the scanner 14. In different examples, different primary colors may be used. While the example in FIG. 1A illustrates three separate red, green, and blue light components for light source 16, in other examples there may be more than three separate components. For instance, there may be an array of red 17, green 18, and blue 19 light components to allow for illuminating different areas across the width of the monochrome scanner 14, where the width of the scanner 14 is related to the width of the medium and the length of the medium is related to the motion axis of the media 25 as it traverses across the monochrome scanner 14. In other examples, there may be a single substantially white light source 16 and a set of programmable filters such as LCD shutters, adjustable color mirrors, etc. to allow for a programmable set of mono-colors 15 to be generated. Other primary color sets may be used besides or in addition to RGB.

In the example shown in FIG. 1A, the light source 16 includes separate red 17, green 18, and blue 19 components which can each be individually controlled by a light control module 24 to modify their intensity to create a range of mono-colors 15 to create a color gamut within a virtual color gamut 32. A color gamut is a subset of colors which can be accurately reproduced in each color space. Generally, the range of colors possible by the modulation of an additive RGB light source 16 includes a range of colors having a color space or RGB gamut 34 greater than and overlapping the color space or CMY gamut 36 that a subtractive CMYK print engine 12 is capable of printing on media 25.

There are many techniques for converting between color spaces and hybrid color appearance spaces such as CIELAB (L=luminance of the white component, a=green-magenta, b=yellow-blue) which has a larger color gamut than either CMY gamut 36 and RGB gamut 34. Generally, when converting between RGB gamut 34 and CMY gamut 36 the color may be first transformed to an intermediate absolute color space, such as CIELAB or CIE 1931, and then back to the other color gamut. Depending on what is to be examined within a region on a printed page that is chosen for analysis, the light control module 24 may perform one or more transformations to choose a particular mono-color 15. Accordingly, mono-color 15 is a particular point in the RGB gamut 34 in this example, and more generally, a single point in the gamut of light source 16.

An analysis module 20 includes a page selection module 22, the light control module 24, a heuristic analysis module 26, and a quality module 28. While FIG. 1A illustrates just one example of how the various modules may be organized and inter-linked, other organizations including combining functions and different linkages are possible and within the scope of the claimed subject matter. FIG. 1A is but one example that is used to help explain how to make and use the claimed subject matter and is not meant to be limiting.

The page selection module 22 (see FIG. 4) allows for choosing a printed page for scanning by scanner 14 and adaptive sampling 11. There are many different trigger events or calibration cycles which may trigger the page selection. Thus, a chosen page may be one of a page printed by users or a calibration page specifically designed to take full advantage of the use of adaptive sampling 11. If a page is chosen for analysis, the page selection module 22 alerts the monochrome scanner 14 and light control module 24 to control the light source 16. The print engine 12 provides the digital reference contents of the printed page to the page selection module 22. The contents may be in a page description language (PDL) format, a raster image processed (RIP) format, or other format depending on the how best to analyze the chosen page with the heuristic analysis module 26. The page selection module 22 upon choosing a page for analysis receives the digital reference contents of the page from print engine 12 and communicates it to heuristic analysis module (HAM) 26 to discover regions with specific color planes. Print engine 12 may communicate the digital reference contents of the page directly to HAM 26 in other examples.

HAM 26 examines the digital reference contents of the chosen page to determine if there are one or more regions of the page that may be adaptively sampled 11. For instance, in one example, HAM 26 may determine a region based on the region having a majority of printer marking being of one primary color (CMYK) of the printer 10. For example, a region may have a majority of yellow (Y) markings and little or no CMK markings. If a region is found for analysis, then the chosen page is scanned by the scanner 14 and illuminated by the light source 16 by having the light control module 24 select a mono-color 15 that maximizes absorption of the mono-color 15 by the one primary color plane found in the region on the chosen page. The maximized absorption may be done by using a mono-color 15 that is complementary to the one primary color plane found to create a scanned image on the page for that primary color plane.

For yellow, the complementary color is blue. Illuminating with blue would cause the white page to be illuminated, but any yellow markings would absorb the blue and be represented as black by the scanner 14. If the page had been illuminated with yellow, the difference of intensities between the white page and the yellow markings would not be as great as the difference in the absorption of the blue light by the yellow markings and the reflected blue light from the white page in the scanned image. Accordingly, the HAM 26 may cause the mono-color 15 to be selected to align with a peak of an absorption profile of the marked region. More detail is discussed in FIGS. 6A and 6B.

In other examples, there may be some small portion of other color markings in the region and the mono-color 15 selected may be a mono-color 15 that maximizes the absorption of the one primary color and minimizes the absorption of other primary colors of the printer 10 that happen to be in the region. For instance, if there is some small amount of magenta also in the region with mostly yellow, the selected mono-color 15 may be violet that is adjusted more to magenta to increase reflection from magenta markings.

Simply illuminating with the missing primary cyan would allow both the yellow and magenta to be illuminated similarly and difficult to differentiate in the scanned image. By adjusting the mono-color 15 from blue to violet, the yellow marking would reflect a little but still be substantially absorbed, while the magenta would be illuminated more than if illuminated by the cyan. Thus, the mono-color 15 may be selected to balance the absorption of the one primary color while minimizing the absorption of the other primary colors. The difference in contrast on the monochrome scan image allows for separating the one desired primary color from the other primary colors in the region. In other words, the contrast ratio between the desired primary color and the other primary colors is maximized by the chosen mono-color 15.

In this example, the monochrome scanner 14 may communicate the mono-color scanned image to HAM 26 to extract the region of interest and performs any transforms, sampling bandwidth conversion, elimination of other primary markings, and conversion to the CMYK gamut 34 as a few examples. HAM 26 then communicates the scanned transformed region and the digital reference (e.g., RIP Image) of the chosen page to the quality module 28 for comparison and identification of any discrepancies. In some examples, there may be multiple scans of different mono colors to create multiple mono-color scanned images for HAM 26.

Consequently, the quality module 28 accepts the digital reference image of the chosen page and the scanned image of the chosen page and compares the digital reference image and the scanned image to determine if a discrepancy has occurred. Some discrepancies may be print error artifacts such as printer quality problems, mechanical problems, and image corruption problems. Print quality discrepancy examples may include fuzzy prints, white lines, the variable print density of the primary color in the region, grey printing such as detection of other primary colors that shouldn't be there, black or white only pages, regular or randomly spaced markings, and residual images. Mechanical discrepancy examples may include mis-feeds, paper jams, skewed prints, and creased prints. Image corruption discrepancy example may include garbled data, lost characters, wrong fonts, split graphic images or text, and misc. splits. Other printer artifacts may include halftone and printer stenography markings.

Figure 1B:
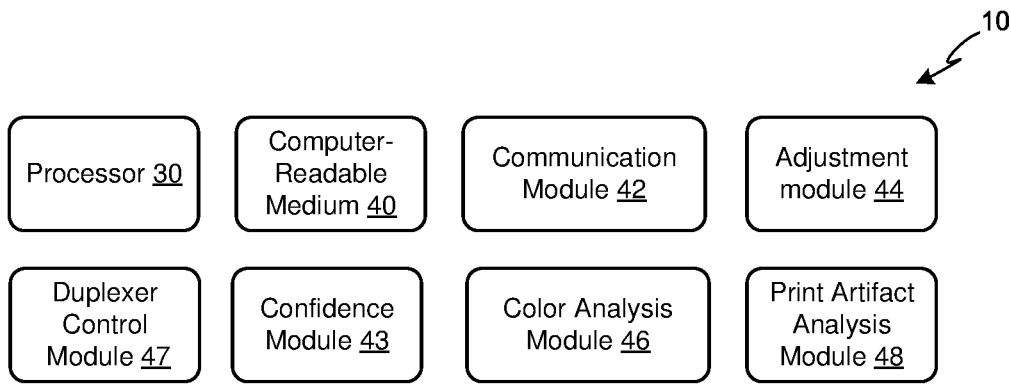
FIG. 1B is a block diagram of possible additional example components of the printer of FIG. 1A.

FIG. 1B is a block diagram of possible additional example components of the printer 10 of FIG. 1A. Additional components may include a processor 30, a non-transitory computer-readable medium (CRM) 40, a communication module 42, an adjustment module 44, a confidence module 43, a color analysis module 46, a duplexer control module 47, and a print artifact analysis module 48. The various examples described within this specification may include logic or several components, modules, or constituents. Modules may constitute either software modules, such as code embedded in the tangible non-transitory machine or computer-readable medium 40 executed as instructions on processor 30 or hardware modules. A hardware module is a tangible unit capable of performing certain operations and can be configured or arranged in certain manners. In one example, one or more computer systems or one or more hardware modules of a printer 10 may be configured by software (e.g., an application, or portion of an application) as a hardware module that operates to perform certain operations as described herein.

In some examples, a hardware module may be implemented as electronically programmable. For instance, a hardware module may include dedicated circuitry or logic that is permanently configured (e.g., as a special-purpose processor, state machine, a field programmable gate array (FPGA) or an application specific integrated circuit (ASIC) to perform certain operations. A hardware module may also include programmable logic or circuitry (e.g., as encompassed within a general-purpose processor 30 or another programmable processor) that is temporarily configured by software to perform certain operations.

The tangible and non-transitory CRM 40 allows for storage of one or more sets of data structures and instructions (e.g., software, firmware, logic) embodying or utilized by any one or more of the methodologies or functions described herein. The instructions may also reside, completely or at least partially, with the static memory, the main memory, and/or within the processor 30 during execution by the printer 10. The main memory and the processor memory also constitute CRM 40. The term "computer-readable medium" 40 may include single medium or multiple media (centralized or distributed) that store the one or more instructions or data structures. The CRM 40 may be implemented to include, but not limited to, solid-state, optical, and magnetic media whether volatile or non-volatile. Such examples include, semiconductor memory devices (e.g. Erasable Programmable Read-Only Memory (EPROM), Electrically Erasable Programmable Read-only Memory (EEPROM), and flash memory devices), magnetic discs such as internal hard drives and removable disks, magneto-optical disks, and CD-ROM (Compact Disc Read-Only Memory) and DVD (Digital Versatile Disc) disks.

A communication module 42 may be used to alert a service provider for printer 10 when the discrepancy is determined. To help prevent unnecessary calls, the confidence module 43 may include instructions or logic to wait until multiple pages have the determined discrepancy to meet a predetermined confidence level before alerting the service provider. For instance, a fuzzy streak may be due to a paper issue that is either resolved over time or upon insertion of a new stack of paper. In other situations, it may be that a user is reusing a previously printed page that has old markings. In some situations, the confidence module 43 may request the user try performing simple corrections such as using a clean sheet of new paper before alerting a service provider that the printer 10 needs servicing.

In other situations, depending on the discrepancy found, the adjustment module 44 may adjust, change, or fine-tune printer parameters based on the determined discrepancy. For instance, some banding or variable density may be caused by wear of the fuser, the imaging system, or developer. The fuser temperature may be adjusted, or the high voltage power supply of the developer adjusted to compensate for any leakage due to connection corrosion and the like, and the laser power may be adjusted to compensate for a weaker laser over time, dust in the optical path, or to compensate for wear out of the photoconductive drum photoreceptive material.

The printer artifact analysis module 48 may include several different routines used to gain forensic knowledge of the scanned image to determine repeating problems such as repetitive missing or added lines and dots using special to time transforms, image recognition routines to detect latent images from previous pages, and image transforms to remove size and skew issues. Character recognition algorithms can be used to detect if there are different fonts or whether random spots are seriously degrading the print quality. For instance, a character recognition accuracy rate may be one quality factor that is analyzed.

The color analysis module 46 may include routines to detect if the ink or toner is within specifications, whether contaminated, fused properly, or possibly a counterfeit material. Also, the color analysis module 46 in some examples may be able to determine the type of paper, the paper grain, any paper coatings, as well as chemical impurities in the media 25 or print markings.

The duplexer control module 47 may include routines to determine if a chosen page should be sent into a duplexer (21, FIG. 1C) to allow a front or back side of a media page to be passed by the monochrome scanner 14 for adaptive analysis. The processor 30 may perform automatic simplex/duplex switching of print jobs based on page content to force chosen pages of a print job through a duplex path in a duplexer 21 even when the chosen pages are simplex jobs or after printing on the back side 25-2 of a page of media 25 in a duplex job when the monochrome scanner 14 is placed within the duplexer 21.

Figure 1C:
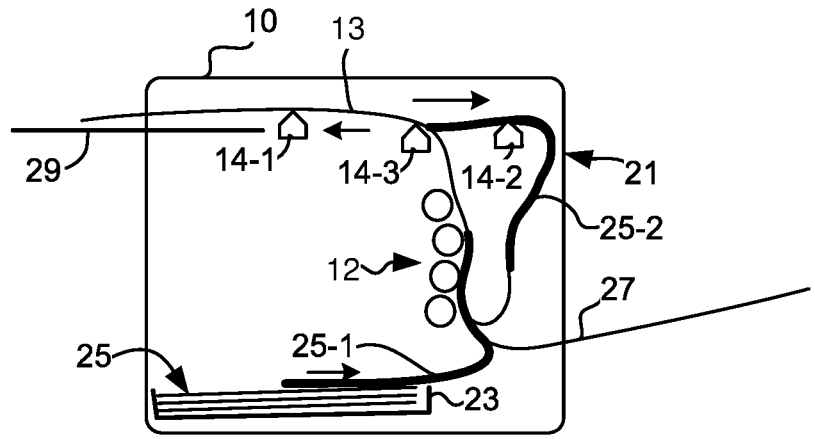
FIG. 1C is an illustration of an example printer with example placements of a scanner along different media paths.

FIG. 1C is an illustration of an example printer 10 with example placements of a monochrome scanner 14 along different media paths. When incorporating a monochrome scanner 14 into printer 10, careful consideration may be given for where the monochrome scanner 14 is placed to prevent contamination from dust and toner particles, or from exposures to temperatures which might impact its effectiveness. If the monochrome scanner 14 is placed too close to the fuser of print engine 12, there may be a significant potential for contamination from toner particles or vapor condensation. Separating the monochrome scanner 14 from sources of loose particles within the print engine 12 such as at the exit path of media 25 or within the duplexer 21 minimizes the chance of contamination and adverse conditions.

In this example, the printer 10 may have multiple media sources such as an internal media tray 23 and a manual feed input tray 27. In one example, the media 25 may follow along media path 13 past the print engine 12 and past a first scanner placement 14-1 near the exit to an output tray 29. This placement of monochrome scanner 14 would only allow for adaptive sampling 11 of a front side 25-1 of a simplex print job or the back side 25-2 of a duplex (double-sided) print job. In another example, the media 25 may follow media path 13 until it is ready to be sent to a duplexer 21 and a second scanner placement 14-2 within the duplexer 21 and situated to read the front side 25-1 of the just printed media 25. In some implementations, the duplexer 21 may be an accessory component for printer 10, and thus the adaptive sampling 11 and monochrome scanner 14 may be added to an existing printer 10, or it may be added as an option to a new printer 10. Another example includes placing monochrome scanner 14 at scanner placement 14-3 to allow the front side 25-1 of a duplex print job to be adaptive scanned before sending the page into an entrance of duplexer 21 to print the back side 25-2 and passed by monochrome scanner 14 at scanner placement 14-3 before deposited to output tray 29. This example may increase the likelihood of toner dust contamination as it places the monochrome scanner 14 closer to the print engine 12. Accordingly, the placement of monochrome scanner 14 may be one of near an exit of the printer 10, by an entrance to the duplexer 21, and within the duplexer 21.

When the monochrome scanner 14 is placed within the duplexer 21, there may be plenty of pages which pass by scanner placement 14-2. Since many printers 10 are designed with auto-duplexing, there is a large probability that a page of media 25 will be passing through the duplexer 21 to flip the page and have its back side 25-2 presented to the print engine 12. This allows for the front side 25-1 of the media 25 to be analyzed with adaptive sampling 11 when a page is duplex printed. However, when a page is simplex or when the back side 25-2 is desired to be analyzed with adaptive sampling 11, then the processor 30 with duplexer control module 47 may instruct the media path 13 to force a chosen page into the duplexer 21 for adaptive sampling 11 to check for printer 10 health issues. Accordingly, the processor 30 may perform automatic simplex/duplex switching of print jobs based on page content to force chosen pages of a print job through a duplex path in a duplexer 21 even when the chosen pages are simplex jobs or after printing on the back side 25-2 of a page of media 25 in a duplex job.

Figure 2:
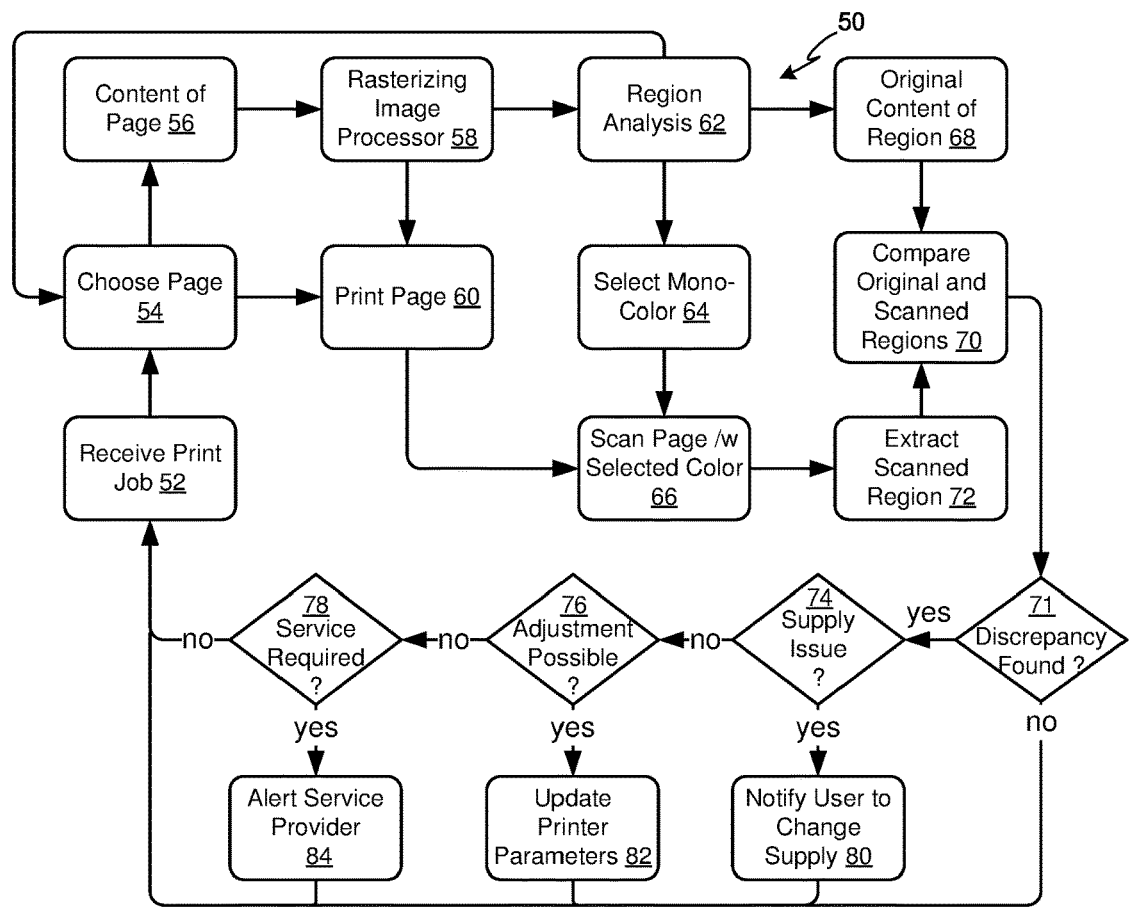
FIG. 2 is a flowchart of example operations involved in an example adaptive sampling technique.

FIG. 2 is a flowchart of example operations 50 involved in an example adaptive sampling 11 technique for an example printer 10. In block 52 a print job is received by the printer 10. The print job may include one or more pages for the printer 10 to print on media 25. While every page of the print job may be checked with adaptive sampling 11, the overhead in doing so may cause the printer performance to be less than what is possible, and in many cases, the chance that there is a printer health issue is rare, particularly at the beginning of the life of the printer 10. Accordingly, based on user selection, trigger events, or calibration page selection, a page is chosen to be printed and adaptively sampled 11 for analysis. If the page is not chosen for adaptive sampling 11, then the page is printed in block 60 without being scanned by scanner 14. If chosen, in block 56 the content of the page is received, whether from the print job or from a calibration routine, and in block 58 a rasterizing image processor 56 is used to create a digital reference RIP format used by the print engine 12. The RIP format is sent to block 62 for region analysis to determine if there are one or more regions on the page which meets a set of predetermined criteria for what is to be analyzed. If there is not an acceptable region found, then block 62 alerts block 54 to simply print the page in block 60 without scanning by scanner 14 and adaptive sampling 11 analysis.

If there is an acceptable region found, then block 62 sends the region image information to block 64 to allow block 64 to select a mono-color 15 that maximizes absorption of one primary color plane and minimizes the absorption of other primary color planes of the printer 10 within the region. Accordingly, the selected mono-color 15 may be selected to align with a peak of an absorption profile of the region.

In block 66, the color source 16 illuminates the chosen printed page with the selected mono-color 15 while it is scanned with monochrome scanner 14 thereby creating a scanned image illuminated with the selected mono-color 15 for a given primary color plane. In block 68, the digital reference content of the region is received from the region analysis routine in block 62. In block 72, the scanned image is received from block 66 and the scanned region extracted. In block 70, the digital reference content of the region and the scanned content of the region are compared and analyzed for printer artifacts or other printer health issues and in decision block 71 a discrepancy may be found. The flow then continues to block 52 to continue the print job.

If there is a discrepancy found, then in decision block 74, the discrepancy is checked to determine if it is a supply issue, such a low ink or toner, bad supply cartridge components, counterfeit supplies, expired supplies, wrong type or bad media 25, and the like. If so, then in block 80, the user may be notified to change the supply or perhaps service it, such as shaking the supply to redistribute the toner or help unclog plugged nozzles for ink supplies. In some examples, the print job may be paused until the supply is checked or changed, while in other examples the discrepancy noted and the print job continued. If so, flow continues to block 52 to continue the print job. If not a supply issue, then in decision block 76, based on the discrepancy found, it is checked to see if an engine adjustment of the printer 10 is possible. If so, then in block 82, printer parameters may be updated to compensate for the discrepancy and flow continued to block 52 to continue the print job. This parameter update can include changing power supply voltages, inter-page gaps, half-tone parameters, laser intensities, changing of print modes (such as from eco-printing to normal printing) and the like. In some examples, changes to the printer parameters may occur between print jobs and not during print jobs. In some examples, when a discrepancy is found in block 71, it is simply flagged or otherwise noted, and the processing of blocks 74 and 80, 76 and 82, and 78 and 84 may be performed after the print job has finished and not performed in real-time during the print job. In other examples, if a discrepancy is found in block 71, information about the comparison in block 70 may be pushed to a cloud service and the decisions and remedies of blocks 74 and 80, 76 and 82, and 78 and 84 are then made in the cloud service, not on the printer 10.

If engine adjustment is not possible, then in decision block 78 a determination may be made whether service is required. A predetermined number of the same discrepancy or a predetermined number of different discrepancies may be accumulated before determining if service is required. If so, then in block 84, a service provider is alerted, and in some examples, the print job may be paused or canceled. In other examples, the flow may continue at block 52 to continue the print job. The service provider is often a third-party provider or the manufacturer's representative, but possibly the local company IT department or equipment repair facility. If in block 78 it is determined that service is not yet required, then flow returns to printing the remaining print job at block 52.

Figure 3:
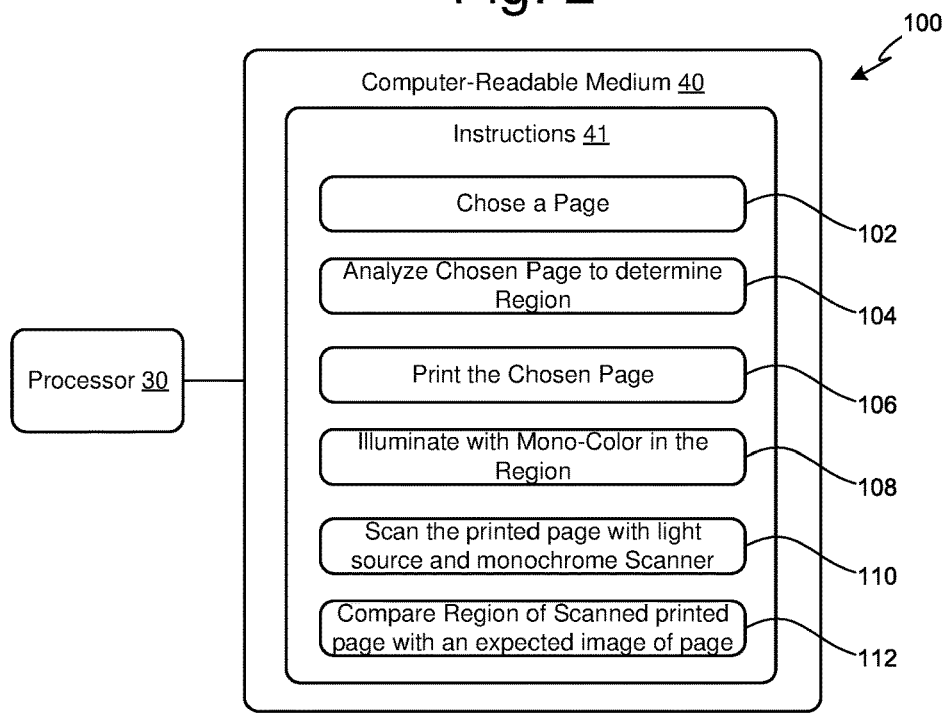
FIG. 3 is a block diagram of an example computer-readable medium containing instructions for adaptive sampling.

FIG. 3 is a block diagram 100 of an example non-transitory computer-readable medium 40 containing instructions 41 for adaptive sampling 11. In block 102, the instructions 41 allow a processor 30 to choose a page from a print job to be printed for heuristic analysis. There are several different triggers, events, or timings in which a page might be selected as discussed in FIG. 4. In block 104, the processor 30 heuristic analyzes the chosen page to determine a region of the page that will be analyzed for print quality of a color plane of a primary color of a print engine 12. The region of the page may include one or more sub-regions as discussed in FIG. 6A. The heuristic analysis may look at several different characteristics of the page to identify primary color planes, patterns, images, lines, fonts, etc. and depending on what particular quality or printer health issue is to be examined, established criteria are set for determining if the desired quality analysis or another quality analysis based on the content of the printed page should be performed. More detail is described in FIG. 5.

If the heuristic analysis established criteria are met, then in block 106 the instructions allow the processor 30 to print the chosen page using the print engine 12. Once the page is printed, in block 108, the processor 30 has instructions 41 to allow a light source 16 to be illuminated for a mono-color 15 that is maximally absorbed within the region for the color plane, and that is minimally absorbed within the region for other primary color planes. In some situations, such as with a large page (e.g., A3), a page may begin being scanned while the printing operation of the page continues. In block 110, the instructions cause the processor 30 to scan the printed page illuminated by the mono-color 15 using light source 16 with a monochrome scanner 14. The scanner 14 may be configured to have a scanned line per inch resolution at least two times the dots per inch resolution of the content on the printed page to minimize aliasing. In block 112, the instructions cause the processor 30 to compare the region of the scanned printed page with an expected image in the region of the page to determine a discrepancy.

Figure 4:
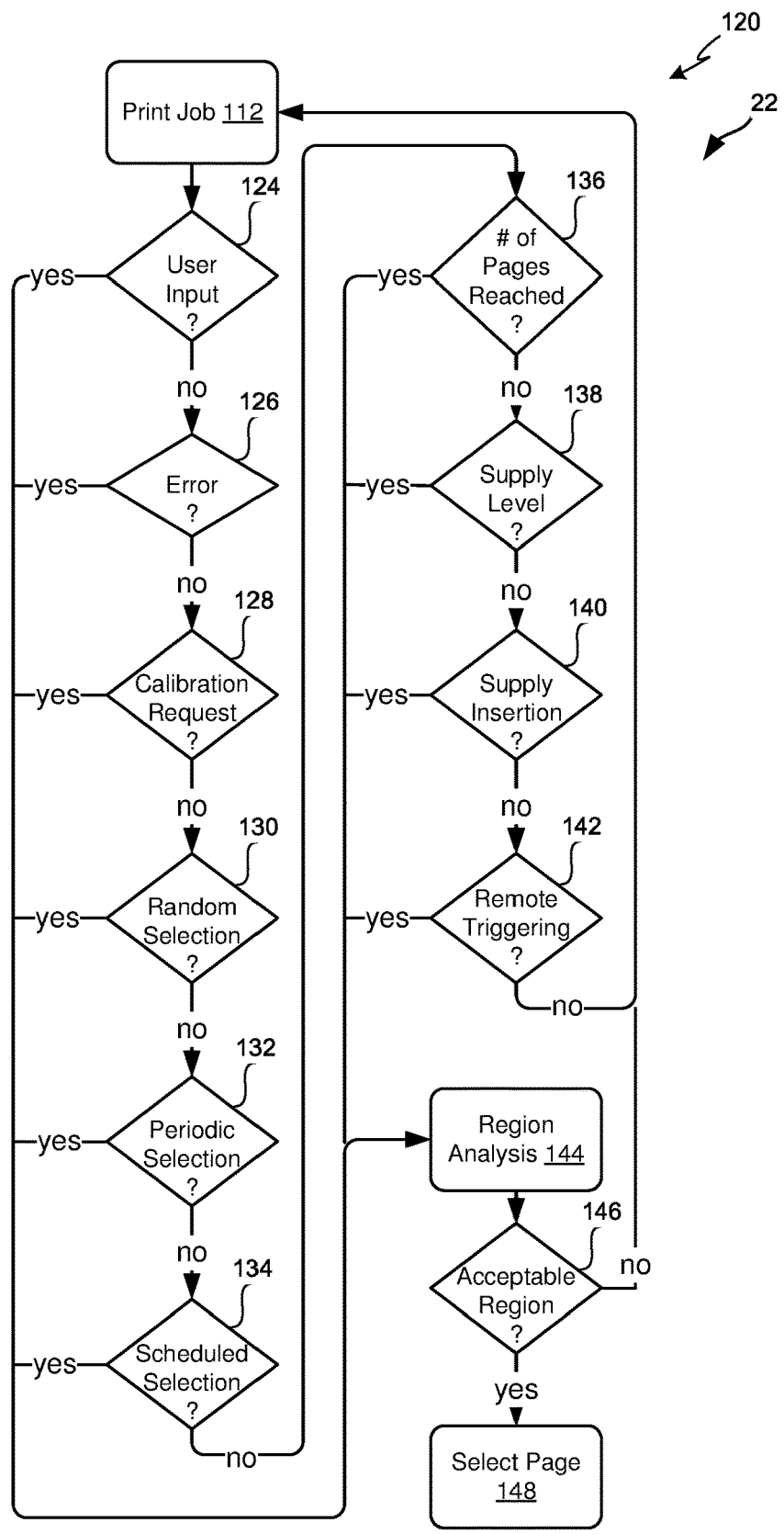
FIG. 4 is a flowchart of an example page selection module.

FIG. 4 is a flowchart 120 of an example page selection module 22 from FIG. 1. There are several different ways in which a page may be chosen for analysis, and the evaluation may be performed in different orders. The flowchart 120 of FIG. 4 is but just one example to help describe how to make and use the claimed subject matter.

In block 122, the printer 10 receives a print job of one or more pages for printing. In block 124, user input may be received to choose a page. For instance, based on the observed output from the printer 10, a user may press a button, screen icon, or other to indicate to the printer 10 that the next page should be adaptively sampled to check for printer health. If the previous page had improper colors, the printer 10 might select the color plane to be evaluated from the supply with the lowest level of toner or ink. If a user has provided input, then in block 144 a region analysis may be performed to look for a region that is mostly the color plane of the lowest supply. The heuristic analysis module 26 can examine the image data for the page to determine if the color plane is present, if not, then control can return to the print job 112. If so, then in block 148 the chosen page is selected for analysis.

In block 126, a check for a printer error may be performed. Based on the error, another page of the print job that may have the same error may be selected and in block 144 analyzed for one or more regions with the appropriate characteristics for analysis of the particular error. If there are acceptable regions in block 146, then the page is selected for analysis, if not, then the print job can resume in block 112 if the error does not cause the printer 10 to cease or pause printing.

In block 128, the printer 10 can check for a calibration request. This request can be based on periodic, random, scheduled, user input, remote input from technical or maintenance staff and the like. The calibration request may in some instances use a page from the print job or in other examples; a special calibration page may be chosen as the page for analysis.

In blocks 130, 132, 134, 136, and 142 a page from the print job may be chosen based respectively on a random selection, a periodic selection, a scheduled selection, after a set number of previously printed pages has been reached, or triggered remotely. If selected, then the page from the print job has a region analysis done in block 144 and if there is an acceptable region the page is selected to be chosen for analysis in block 148. If there is no acceptable region, the flow returns to the print job 112. In some examples, the succeeding pages in the print job or other later print jobs will be selected for region analysis in block 144 until a page has an acceptable region to perform the quality analysis for printer health.

In block 138 and 140, respectively, a change in supply level or a supply insertion may trigger a page of the print job to be selected for region analysis in block 144. In other examples, a change in supply level or supply insertion may cause a predetermined calibration page to be printed. For instance, if during a print job the printer reports that a toner or ink supply is low, and the user replaces it, the next page may be chosen for adaptive sampling 11 to ensure that the new supply is the proper color, the voltages and other settings are set properly, not expired, and perhaps if counterfeit.

Figure 5:
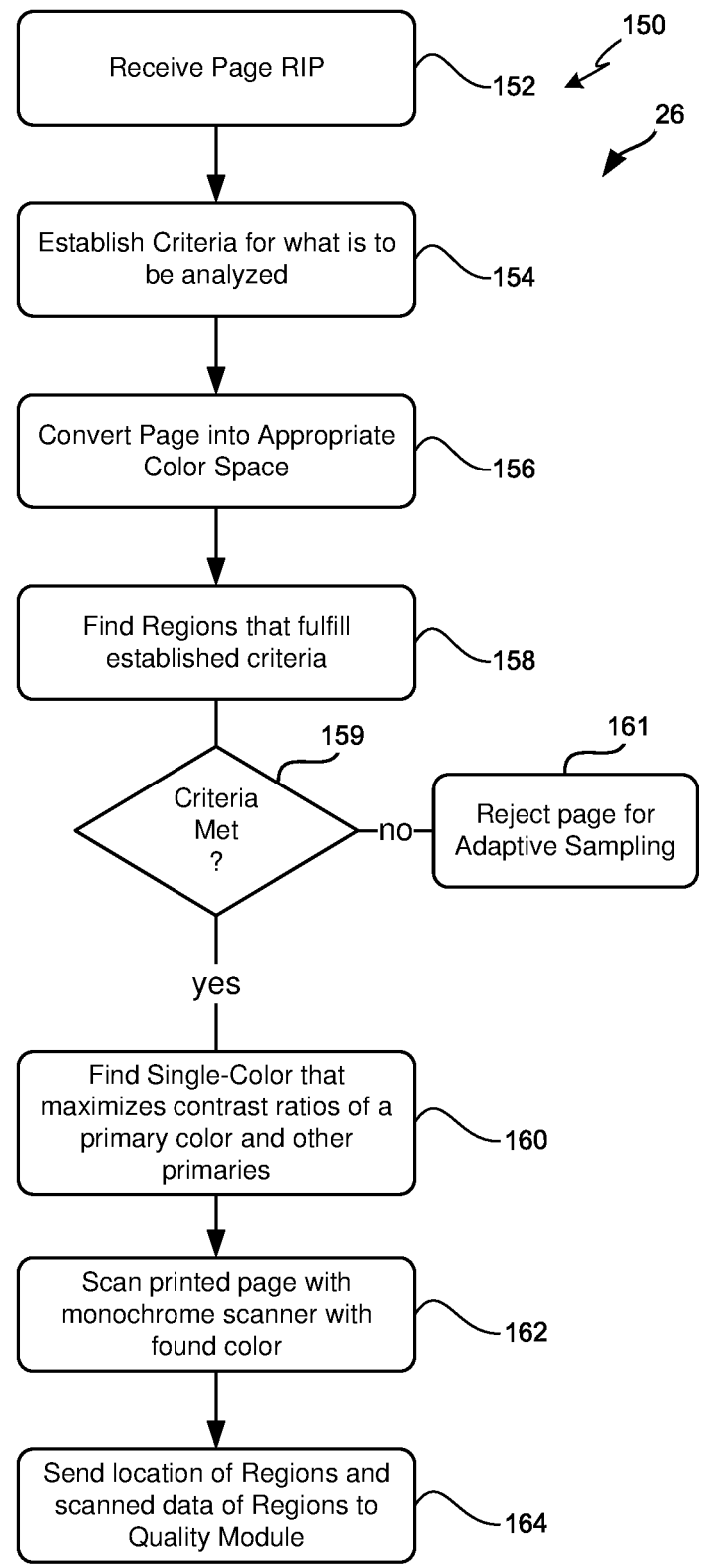
FIG. 5 is a flowchart of an example heuristic analysis module.

FIG. 5 is a flowchart 150 of an example heuristic analysis module 26. In this example, in block 152 a raster image processed (RIP) page is received. The RIP page is generally in a format of rasterized images for each color plane to be printed on the page. In block 154, a set of criteria is established based on what is to be analyzed. The set of criteria can be from a database or table indexed by the various quality, supply, or health issues which a particular adaptive sampling printer 10 is designed to perform. In block 156, if needed for the particular issue, the RIP page may be transformed from various color planes with a first color space to a different set of color planes with a different color space. In most examples, the appropriate color space is the same as the default RIP format for the printer 10 and the conversion is just a simple identity conversion or not performed.

In block 158, the page is searched for one or more regions that fulfill established criteria from block 154. In decision block 159, if the criteria are not met, then in block 161 the page is rejected for adaptive sampling 11. If the criteria are met then in block 160, a mono-color 15 is found that either maximizes absorption of the mono-color 15 in the regions, or balances maximal absorption of a mono-color 15 of a primary color of the printer 10 while minimizing absorption of the mono-color 15 for other primary colors of the printer 10. In other words, the contrast ratio between the primary color and the other primary colors is maximized by the chosen mono-color 15. In another example, the mono-color 15 is selected to align with a peak of an absorption profile of the region. In block 162, after the page is printed, the chosen printed page scanned with monochrome scanner 14 the found mono-color 15. In block 164, the location of the regions and the scanned data of the regions are sent to the quality module 28. In other examples, all of the scanned data is sent to the quality module 28 along with the found mono-color 15 to allow areas outside of the regions also to be quality analyzed depending on the content of the printed page.

Figure 6A:
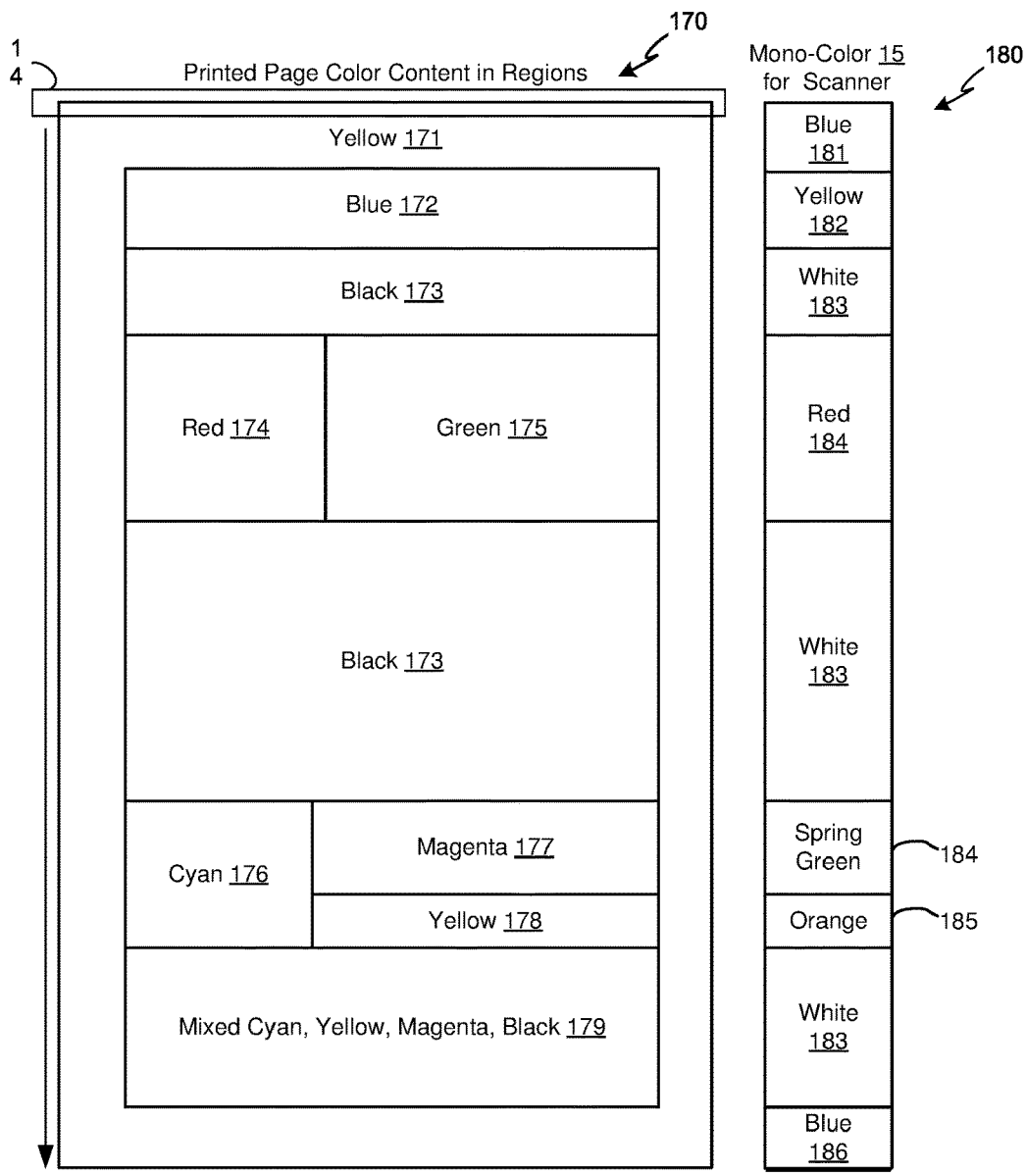
FIG. 6A is an example layout for a printed page and a selection of a mono-color for different regions based on the heuristic analysis.

FIG. 6A is an example of a layout 170 for a printed page with various color content in different regions and a set of selected colors 180 based on the heuristic analysis. The monochromatic scanner 14 scans the page in the downward direction shown with a mono-color 15 chosen and modulated based on region analysis. In some examples, the light source 16 may only illuminate a mono-color 15 across the width of the scanner 14 and page. In other examples, the light source 16 may have programmable regions of mono-colors 15 across the width of the scanner 14. Also, in some examples, during a scan of the length of the page, the mono-color 15 may be fixed while in other examples, the mono-color 15 may be modulated based on the position of scanner 14 with respect to the page.

Figure 6B:
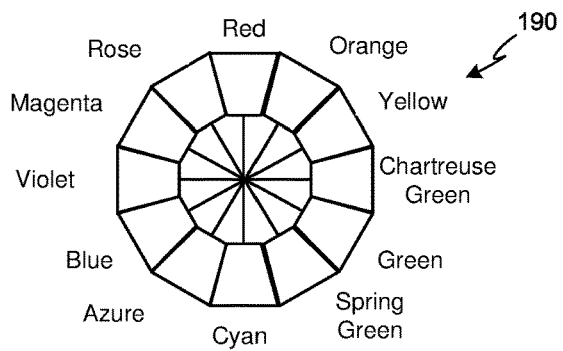
FIG. 6B is an example color wheel illustrating complementary relationships between different colors.

FIG. 6B is an example color wheel 190 that illustrates relationships between different colors. Each color on the color wheel 190 is shown with a line to its complementary or opposite color. A complimentary color has a minimal reflection when illuminated with its respective opposite color. For instance, in the RGB additive color model and the CMY subtractive color model, the complementary pairs are red-cyan, green-magenta, and blue-yellow.

Referring to FIG. 6A, region 171 forms a border around the outside edge of the printed page. In many cases, this region appears as the paper color, a bright white. However, printer steganography may be used to encode the printer serial number, the time and date, and possibly other information by hiding data within data where tiny yellow dots are added to each page including region 171. To the human eye, the tiny yellow dots may be imperceptible, and if scanned with yellow light, the difference in reflection from the paper and the yellow dots may not have a large contrast ratio suitable for analysis. However, by scanning with the complementary or opposite mono-color 15 for yellow, which is blue 181, the absorption of the mono-color 15 is maximized. Thus, the monochrome scanner 14 creates an image with a high contrast ratio between the white page and the yellow dots. One quality analysis may be verification of printer stenography markings.

In region 172, perhaps a title, the main primary color is blue. Scanning with its opposite mono-color yellow 182 maximizes the absorption of the yellow light by the blue toner or ink and minimizes the absorption of the yellow dots from the printer steganography.

In regions 173, an area of text, there may be a primary "K" or black toner or ink, or a combination of cyan, magenta, and yellow toners or ink to create the black text. In this example, the region can be scanned with a complementary or opposite color of "white" 183 which is a combination of red, green, and blue primaries at equal intensities. Since the primaries CMY are in equal luminance from the page, the mono-color 15 is a combination of the respective complementary colors, red, green, blue at the same intensities to create a white light. Thus, the primaries in regions 173 each maximally absorb their respective complementary colors, and overall, the black text maximally absorbs the white 183 light for mono-color 15. In this region, formatter errors, font checking, and character recognition can be performed as different quality measures to help determine printer health.

Regions 174 and 175 are adjacent to each other across the width of the page. In this example, the region 175 contains more green printer markings than region 174. Therefore, a peak in the absorption profile of region 175 aligns to red 184, while a peak in the absorption profile of region 174 aligns to green. If the monochrome scanner 14 can only support a single mono-color 15 across its width when scanning, then the mono-color 15 chosen would be red 184 to align to the highest peak of the absorption profile for the combination of regions 174 and 175. However, if the scanner 14 can vary the mono-color 15 across its width while scanning, the mono-color 15 chosen for region 174 would be green, and the mono-color 15 chosen for region 175 would be red 184.

Regions 176, 177, and 178 have principle colors cyan, magenta, and yellow, respectively. In one example, region 177 has more magenta markings than region 176 has cyan markings, while region 176 has more cyan marking than region 178 has yellow markings. These CMY colors are each a primary of the print engine 12 and form a "triad" on the color wheel of FIG. 6B. If only a single mono-color 15 could be chosen for scanner 14 across its width and that of the page, then when scanner 14 is traversing regions 176 and 177, the mono-color 15 may be selected as spring green 184 rather than just green which is the opposite color of magenta. By using spring green 184, the absorption of the spring green 184 mostly absorbed by the magenta while it is mostly reflected by the cyan in region 176. This increases the contrast ratio between one primary, magenta, with respect to other primaries, cyan. When the scanner 14 traverses the regions 176 and 178 and since there are more cyan markings than yellow markings, the mono-color 15 may be changed to orange instead of the opposite red for cyan to allow still the mono-color 15 to be maximally absorbed by cyan but minimally absorbed by yellow. This again increases the contrast ratio between primary colors of the scan engine 12.

Region 179 has a mixed combination of cyan, yellow, magenta, and black, such as with an image. In this case, depending on the particular health issue to be addressed, the mono-color 15 can be chosen to maximize the contrast of a desired primary with respect to the other primaries by choosing the opposite color of the desired primary. For example, if a health issue were regularly space magenta lines, region 179 could be scanned with a green light to enhance the absorption of green light where there is magenta marked while allowing the yellow and cyan markings and paper to be reflected. Any black absorption can be removed by image processing by subtracting the expected black markings. Therefore, even if the regularly spaced magenta lines where faint, they would be picked up by the monochrome scanner 14 with the green mono-color 15 illumination despite all the other primaries present.

Alternatively, when region 179 has a distribution of primary colors that varies considerably across the length and width of the region, a mono-color 15 such as white 183 may be used to scan the area to get a black and white variable contrast image. This monochrome variable contrast image may still be examined in some examples for missing lines, random spots, residual images, etc.

Figure 7:
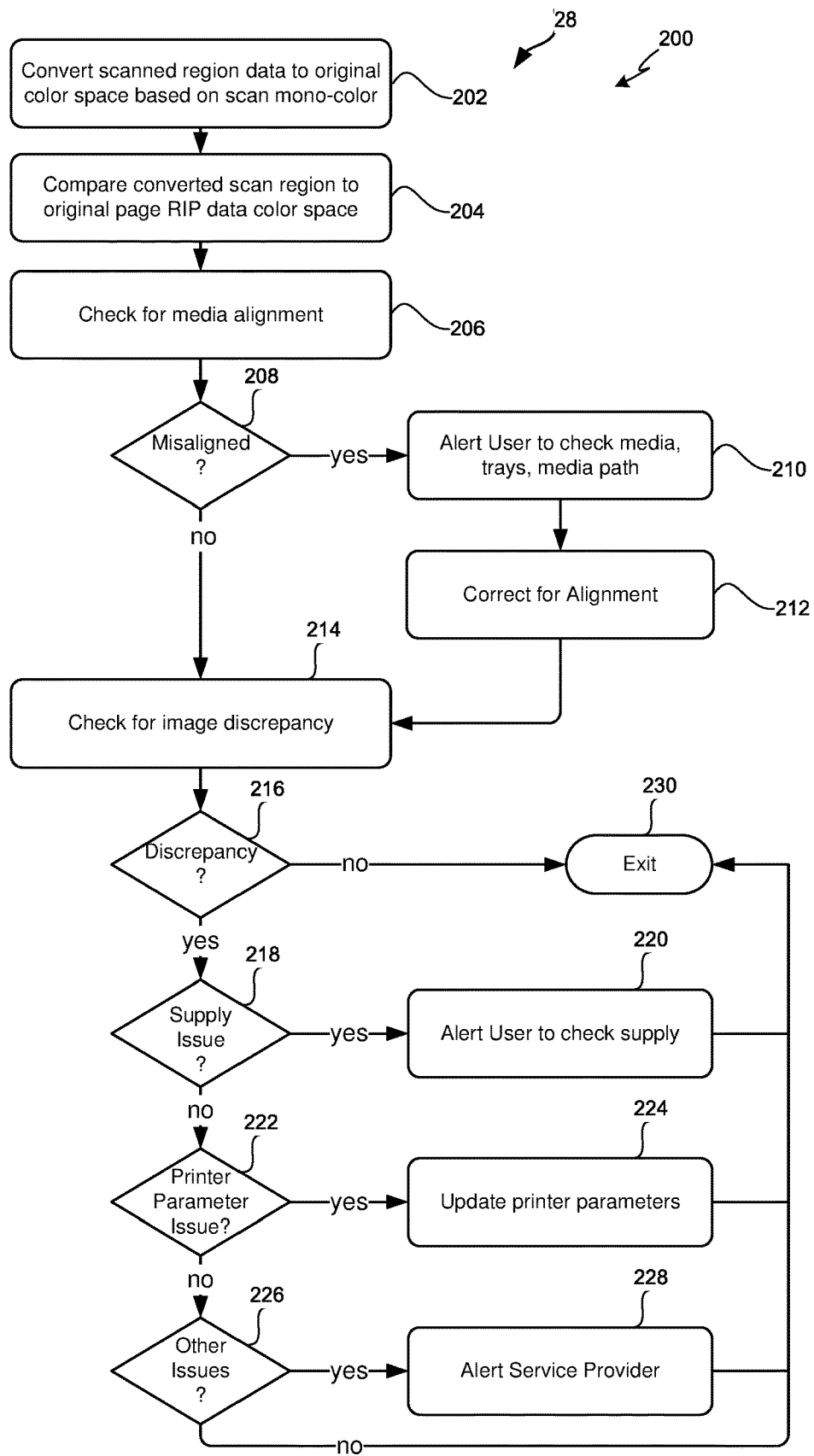
FIG. 7 is a flowchart of an example quality module.

FIG. 7 is a flowchart 200 of an example quality module 28. The example shown is but one example, and other examples may include additional forensic analysis and print quality metric analysis routines to look for discrepancies. In block 202, the scanned region is converted to its original color space based on the mono-color 15 used in the scan. In block 204 the converted scan region is compared to the digital reference page RIP data color space data for that region. In block 206, the two regions are checked for media alignment issues, such as scaling, rotation, skewing, slippage, page alignment, etc. In decision block 208, if there is misalignment, then the user of the printer 10 can be alerted in block 210 to check the media type, the media trays, and media paths 13 depending on the type of alignment found. In block 212, any image transforms are done to correct for scaling, rotation, skewing, slippage and page alignment to maximize the correlation between the scanned data region and the expected print data for the region to minimize printer mechanical media path 13 errors.

In block 214, the scanned region data and the digital reference page RIP data for the region are then compared to check for image defects. For instance, by using a differencing routine, the resulting difference image may show regularly spaced lines or columns of extra or missing lines as well as missing or added spots. Also, residual images may be detected by using one or more special to frequency transforms of the scanned region data and the digital reference RIP data and comparing the frequency distributions.

In decision block 216, if no discrepancy is found then in block 230 the quality module 28 may exit. If a discrepancy is found, then a decision tree may be used to try to isolate and correct the issue before calling a service provider. In some cases, detection of streaks, horizontal and vertical lines, random or periodic dots, blank spots, fades, smudges, and tire treads may all indicate an issue with one or more supplies, including media 25. Skew, misalignment, creases, registration and slippage issues may indicate not only media but media tray or media path 13 issues.

Accordingly, in block 218, if the discrepancy is a supply issue, then in block 220, the quality module 28 alerts the user to check any suspected supplies based on the quality analysis. Sometimes, however, it may be that the printer 10 is wearing out or needs some adjustment. Several different parameters of the printer 10 depending on its type may need to be adjusted over time. For instance, for a laser printer, variable print density issues may be caused by several factors. If print density is grey rather than black, the print density setting may be changed to make the print blacker. The print density setting can be changed to keep the compensate for the wear of the photoreceptor or developing components. If the printed image has a grey background, the background level of the photoconductor may be insufficient, and this discrepancy can be corrected by adjusting the charging parameters. Other items that may be adjusted on a laser printer include changing the developer high voltage power supply level, the inter-page gap, the speed of a rotating mirror for the laser, the laser intensity, and the time between cleaning cycles of the toner cartridges as just some examples. Accordingly, in decision block 222, if the discrepancy is a printer parameter issue, in block 224, the quality module 28 may update the printer parameters accordingly.

If there are no supply or printer parameter issues or over time the supply and printer parameter issues are not correcting the discrepancy, then in decision block 226 if such other issues exist, then in block 228 a service provider is alerted. The service provider may be an internal company IT or maintenance group, a manufacturer of the printer 10 representative, or a third-party service provider.

Figure 8A:
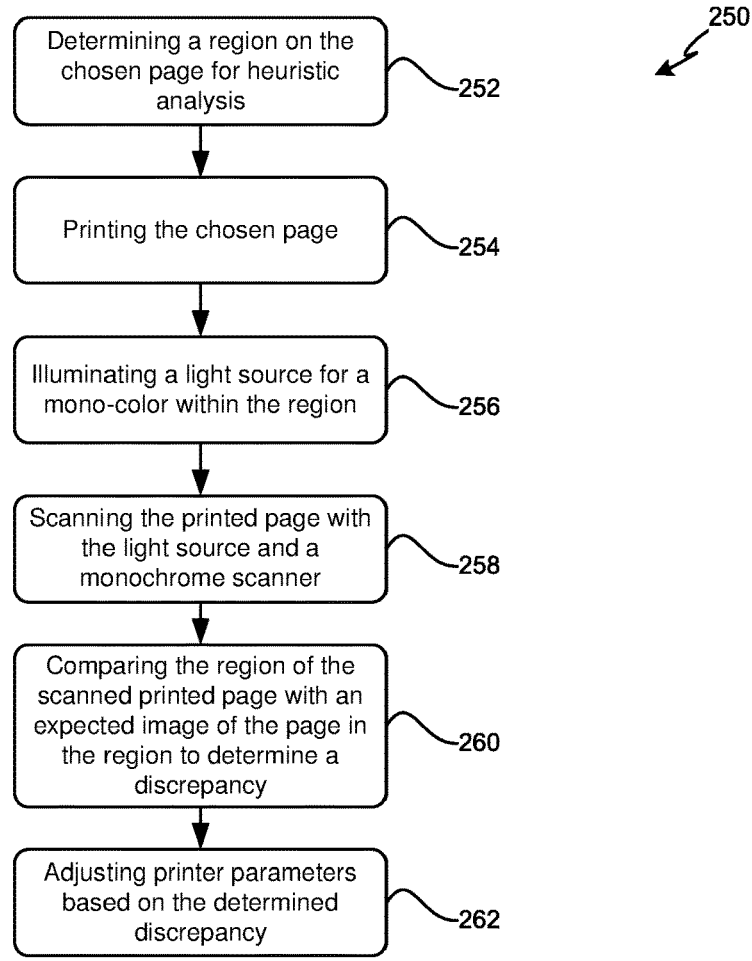
FIG. 8A is a flowchart of an example method of performing adaptive sampling.
Figure 8B:
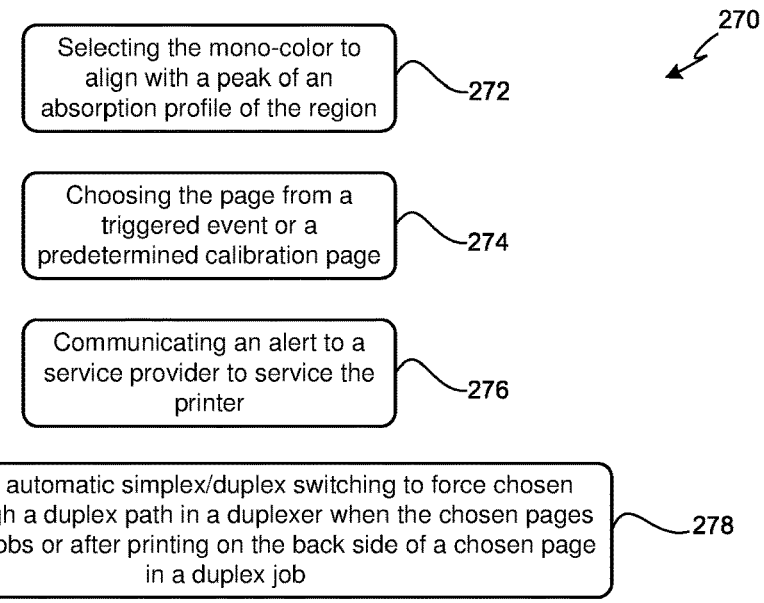
FIG. 8B is a flowchart of additional example operations that may be performed in the example method of FIG. 8A.

FIGS. 8A and 8B help provide a summary of the foregoing discussion. Further details are found in the appropriate prior sections. FIG. 8A is a flowchart of an example method 250 of performing adaptive sampling 11 with multiple operations. Initially, a page is chosen to be printed by the printer 10 for analysis. In block 252, one or more regions on the chosen page are determined by heuristic analysis, and in block 254 the chosen page is printed. In block 256, a light source 16 is illuminated with a mono-color 15 that is maximally absorbed within the region(s). In block 258 the printed page is scanned with the light source 16 and a monochromatic scanner 14. In block 260, the region of the scanned printed page is compared with an expected image of the page in the region to determine a discrepancy. In block 262, the parameters of printer 10 may be adjusted based on the determined discrepancy.

FIG. 8B is a flowchart of additional example operations 270 that may be performed in the example method 250 in FIG. 8A. In block 272, the mono-color 15 may be selected to align with one or more peaks of an absorption profile of the region or to maximize a contrast ratio between one primary and other primaries of printer 10. In block 274, the page may be chosen from a triggered event or a predetermined calibration page. In block 276, an alert may be communicated to a service provider to perform service on the printer 10. In block 278, automatic simplex/duplex switching may be performed to force chosen pages through a duplex path in a duplexer when the chosen pages are simplex jobs or after printing on the back side of a chosen page in a duplex job.

While the claimed subject matter has been particularly shown and described with reference to the foregoing examples, those skilled in the art will understand that many variations may be made therein without departing from the intended scope of subject matter in the following claims. This description should be understood to include all novel and non-obvious combinations of elements described herein, and claims may be presented in this or a later application to any novel and non-obvious combination of these elements. The foregoing examples are illustrative, and no single feature or element is to be used in all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A printer with adaptive sampling, comprising:
a print engine having a plurality of primary print colors;
a monochrome scanner;
a light source having independently controlled primary colors oriented to illuminate a media from the print engine; and
an analysis module including:
a page selection module to select a chosen page of media for analysis;
a heuristic analysis module to analyze the chosen page and select a region of the page for analysis that has a majority of printer marks in one of the primary print colors of the print engine;
a light control module to select one of the primary colors of the light source that maximizes absorption of the one of the primary print colors of the print engine and that minimizes the absorption of other of the primary print colors of the print engine, as a mono-color for the light source, in the region on the chosen page; and
a quality module to accept an image of the chosen page and a scan of the chosen page with the monochrome scanner illuminated by the selected mono-color and compare the image and the scan within the region to determine a discrepancy, wherein the discrepancy is determined based on just a comparison of the region of the scanned printed page with the expected image of the page in the region.

2. The printer of claim 1, further comprising a communication module to alert a service provider when the discrepancy is determined.

3. The printer of claim 1, wherein the placement of the monochrome scanner may be one of near an exit of the printer, by an entrance to a duplexer, and within the duplexer.

4. A non-transitory computer-readable medium for adaptive sampling, comprising instructions that when read and executed by a processor cause the processor to:
choose a page to be printed for analysis by a printing engine having a plurality of primary print colors;
heuristic analyze the chosen page to select a region of the page for quality analysis that has a majority of printer marks in one of the primary print colors of the print engine;
print the chosen page using the print engine;
select one of a plurality of independently controlled primary colors of a light source that maximizes absorption of the one of the primary print colors of the print engine and that minimizes the absorption of other of the primary print colors of the print engine, as a mono-color for the light source, to illuminate the chosen page;
scan the printed page illuminated by the mono-color with a monochrome scanner; and
compare the region of the scanned printed page with an expected image of the page in the region to determine a discrepancy, wherein the discrepancy is determined based on just a comparison of the region of the scanned printed page with the expected image of the page in the region.

5. The computer-readable medium of claim 4, further comprising instructions that cause the processor to communicate an alert to a service provider when a discrepancy is determined.

6. The computer-readable medium of claim 5, wherein the instructions to communicate includes instructions to wait until multiple pages have the determined discrepancy to meet a predetermined confidence level before alerting the service provider.

7. The computer-readable medium of claim 4, further comprising instructions that cause the processor to adjust a halftone calibration for the printer based on the determined discrepancy.

8. The computer-readable medium of claim 4, further comprising instructions that cause the processor to perform automatic simplex/duplex switching of print jobs based on page content to force chosen pages of a print job through a duplex path in a duplexer when the chosen pages are part of simplex jobs or after printing on a back side of a page in a duplex job.

9. A method of adaptive sampling, comprising:
selecting a region on a chosen page for heuristic analysis that has a majority of printer marks in one of the primary print colors of a print engine;
printing the chosen page using the print engine;
selecting one of a plurality of independently controlled primary colors of a light source that maximizes absorption of the one of the primary colors of the print engine and that minimizes the absorption of other of the primary print colors of the print engine, as a mono-color for the light source, to illuminate the chosen page;
illuminating the region within the mono-color;
scanning the printed page as illuminated with the mono-color using a monochrome scanner;
comparing the region of the scanned printed page with an expected image of the page in the region to determine a discrepancy, wherein the discrepancy is determined based on just a comparison of the region of the scanned printed page with the expected image of the page in the region; and
adjusting printer parameters based on the determined discrepancy.

10. The method of claim 9, further comprising choosing the page from one of a triggered event and a predetermined calibration page.

11. The method of claim 9, further comprising performing automatic simplex/duplex switching to force chosen pages through a duplex path in a duplexer when the chosen pages are simplex jobs or after printing on the back side of a chosen page in a duplex job.

12. The method of claim 9, further comprising communicating an alert to a service provider to service the printer.

* * * * *